(12) United States Patent
Gormley (10) Patent No.: US 9,611,808 B2
(45) Date of Patent: Apr. 4, 2017

(54) BLOCKER DOOR LOCK MECHANISM OF A THRUST REVERSER FOR A TURBOFAN ENGINE

(71) Applicant: Rohr, Inc., Chula Vista, CA (US)

(72) Inventor: Timothy Gormley, Bonita, CA (US)

(73) Assignee: Rohr, Inc., Chula Vista, CA (US)

( * ) Notice: Subject to any disclaimer, the term of this patent is extended or adjusted under 35 U.S.C. 154(b) by 405 days.

(21) Appl. No.: 14/222,165

(22) Filed: Mar. 21, 2014

(65) Prior Publication Data

US 2015/0267639 A1 Sep. 24, 2015

(51) Int. Cl.
*F02K 1/70* (2006.01)
*F02K 1/72* (2006.01)
*F02K 1/76* (2006.01)

(52) U.S. Cl.
CPC ............... *F02K 1/70* (2013.01); *F02K 1/72* (2013.01); *F02K 1/766* (2013.01)

(58) Field of Classification Search
CPC ... F02K 1/70; F02K 1/72; F02K 1/763; F02K 1/766; F02K 1/62; F02K 1/625
See application file for complete search history.

(56) References Cited

U.S. PATENT DOCUMENTS

| | | | |
|---|---|---|---|
| 3,503,211 A * | 3/1970 | Holman | F02K 1/72 239/265.29 |
| 3,610,533 A * | 10/1971 | Johnson | F02K 1/1215 239/265.19 |
| 4,275,560 A | 6/1981 | Wright et al. | |
| 4,807,434 A * | 2/1989 | Jurich | F02K 1/72 239/265.29 |
| 5,046,307 A | 9/1991 | Matta et al. | |
| 5,778,659 A * | 7/1998 | Duesler | F02K 1/09 239/265.27 |
| 6,474,059 B2 | 11/2002 | Stretton | |
| 6,845,946 B2 | 1/2005 | Lair | |
| 6,895,742 B2 * | 5/2005 | Lair | F02K 1/70 239/265.37 |
| 7,559,507 B2 | 7/2009 | Harrison et al. | |
| 7,600,371 B2 | 10/2009 | Sternberger | |
| 7,690,190 B2 | 4/2010 | Thornock et al. | |
| 8,109,467 B2 | 2/2012 | Murphy | |
| 8,256,204 B2 | 9/2012 | Hatrick | |
| 2007/0234707 A1 | 10/2007 | Beardsley | |
| 2010/0270428 A1 | 10/2010 | Murphy | |
| 2013/0280052 A1 | 10/2013 | Gonidec et al. | |

FOREIGN PATENT DOCUMENTS

FR WO2014029929 * 2/2014 ............... F02K 1/62

OTHER PUBLICATIONS

EP search report for EP15159961.0 dated Aug. 26, 2015.

* cited by examiner

*Primary Examiner* — Andrew Nguyen
(74) *Attorney, Agent, or Firm* — O'Shea Getz P.C.

(57) ABSTRACT

A thrust reverser of a nacelle for a turbofan engine has a translating structure and a blocker door device capable of diverting a bypass flowpath for reversing propulsion direction. The translating structure moves axially between a forward position and a rearward position and thereby drives a compound motion of a blocker door of the blocker door device that moves between respective stowed and deployed states. A lock mechanism of the thrust reverser may be utilized in combination with a link-less linkage and is orientated between the blocker door and a stationary member that may include vanes that divert bypass flow.

14 Claims, 6 Drawing Sheets

BLOCKER DOOR LOCK MECHANISM OF A THRUST REVERSER FOR A TURBOFAN ENGINE

BACKGROUND

The present disclosure relates to a thrust reverser for a turbofan engine and more particularly to a blocker door lock mechanism of the thrust reverser.

Turbofan engines are known to include a fan section that produces a bypass airflow for providing the majority of engine propulsion and a combustion or core airflow for compression, mixing with fuel, combustion and expansion through a turbine to drive the fan section. The engines further include nacelles that partially surround the core of the engine, include a pylon for securing the engine to a structure such as an aircraft wing, and provide an annular bypass airflow duct for directing the bypass airflow in a rearward direction to produce forward propulsion. The nacelles may further include thrust reversers capable of redirecting the bypass airflow from the rearward direction to, at least partially, a forward direction thus producing a rearward propulsion. As an example, such rearward propulsion may serve to decelerate the forward motion of an aircraft soon after landing.

Thrust reversers may include a plurality of blocker doors physically capable of changing positions through mechanical and hydraulic linkages from a stowed position for forward propulsion and to a deployed position for rearward propulsion. There exists a need to improve such linkages and reduce linkage obstruction in the bypass airflow duct.

SUMMARY

A thrust reverser according to one, non-limiting, embodiment of the present disclosure includes a translating structure constructed and arranged to move between first and second positions; a blocker door pivotally engaged to the translating structure for pivotal movement between a first state and a second state; a stationary member; and a lock mechanism arranged between the blocker door and the stationary member.

Additionally to the foregoing embodiment, the lock mechanism is engaged when the blocker door is in the first state and the translating structure is in the first position, and disengaged when the blocker door is in the second state and the translating structure is in the second position.

In the alternative or additionally thereto, in the foregoing embodiment, the stationary member includes turning vanes for diverting bypass flow.

In the alternative or additionally thereto, in the foregoing embodiment, the blocker door includes an exposed surface defining in-part a bypass flowpath and an opposite surface with the lock mechanism arranged between the opposite surface and the stationary structure.

In the alternative or additionally thereto, in the foregoing embodiment, the blocker door includes a base edge portion and an opposite distal edge, and the base edge portion is pivotally engaged to the translating structure.

In the alternative or additionally thereto, in the foregoing embodiment, the lock mechanism includes an arm projecting outward from the opposite surface, and through at least a portion of the translating structure when the blocker door is in the first state.

In the alternative or additionally thereto, in the foregoing embodiment, the arm does not extend through the translating structure when the blocker door is in the second state.

In the alternative or additionally thereto, in the foregoing embodiment, the arm projects to and supports a distal head and the head rides upon a first track of the lock mechanism carried by the stationary member.

In the alternative or additionally thereto, in the foregoing embodiment, the lock mechanism includes a second track opposed to and spaced from the first track and carried by the stationary structure.

In the alternative or additionally thereto, in the foregoing embodiment, the distal head is a roller guided between the first and second tracks.

A nacelle for a turbofan engine according to another, non-limiting embodiment includes a stationary member concentric to an engine axis; a translating structure constructed and arranged to move between a first position and a second position; a blocker door device constructed and arranged to move between a stowed state when the translating structure is about in the first position and a deployed state when the translating structure is in the second position, the blocker door device including a blocker door and a lock mechanism, the blocker door being movably engaged to the translating structure and including a first surface defining in-part a bypass flowpath and an opposite second surface, and the lock mechanism orientated between the second surface and the stationary member.

Additionally to the foregoing embodiment, the lock mechanism is locked when the blocker door is in the stowed state.

In the alternative or additionally thereto, in the foregoing embodiment, the stationary member includes a diverting vane and the stationary member is exposed to the bypass flowpath when the blocker door is in the deployed state and is isolated from the bypass flowpath when the blocker door is in the stowed state.

In the alternative or additionally thereto, in the foregoing embodiment, the lock mechanism is orientated between the second surface and the stationary member and extends through at least a portion of the translating structure when the blocker door is in the stowed state and does not extend through the translating structure when the blocker door is in the deployed state.

In the alternative or additionally thereto, in the foregoing embodiment, the lock mechanism includes an arm projecting outward from the second surface and to a distal head, and a track supported by the stationary member and for guiding the distal head.

The foregoing features and elements may be combined in various combinations without exclusivity, unless expressly indicated otherwise. These features and elements as well as the operation thereof will become more apparent in-light of the following description and the accompanying drawings. It should be understood, however, the following description and figures are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
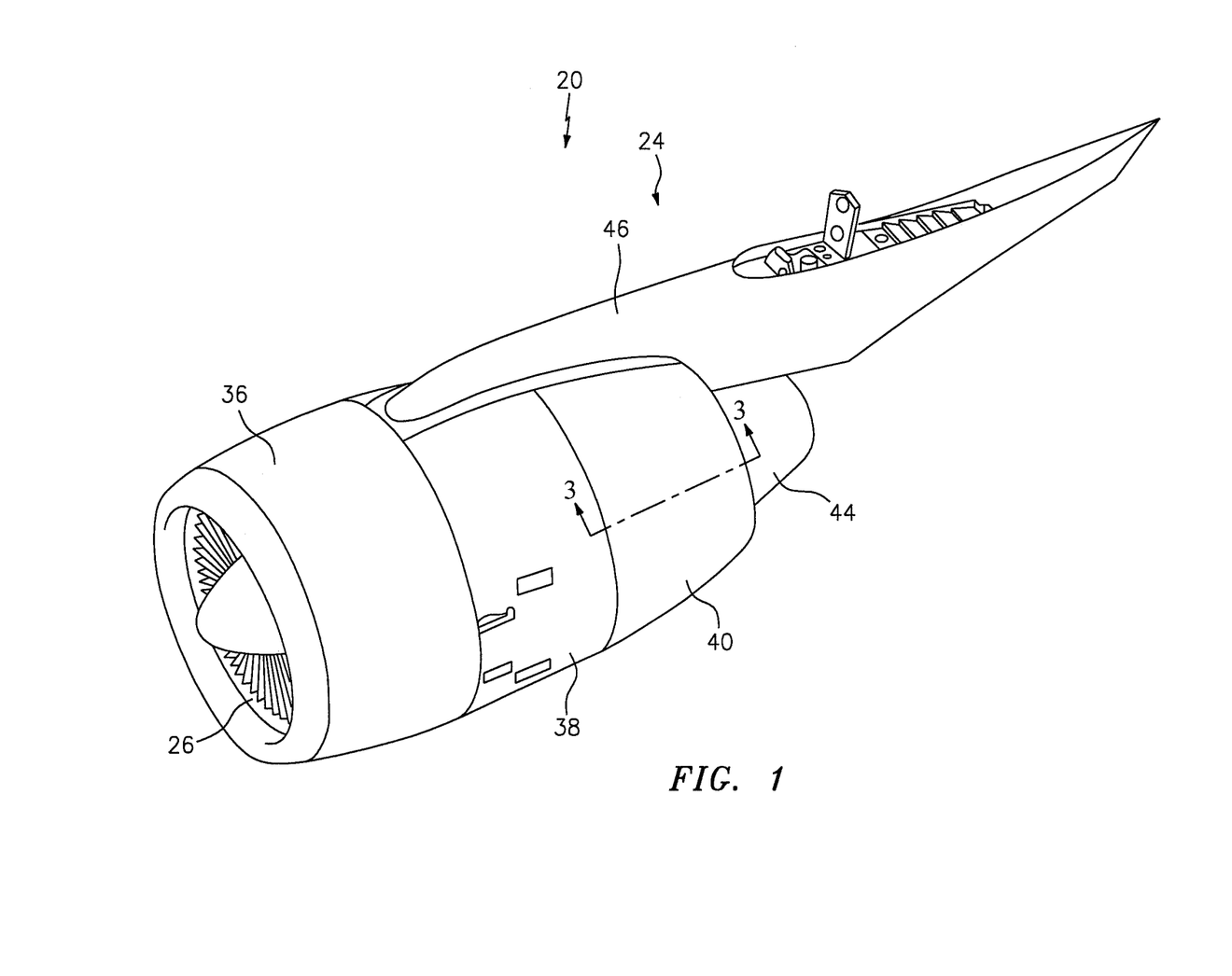
FIG. 1 is a perspective view of a turbofan engine according to one non-limiting embodiment of the present disclosure.
Figure 2:
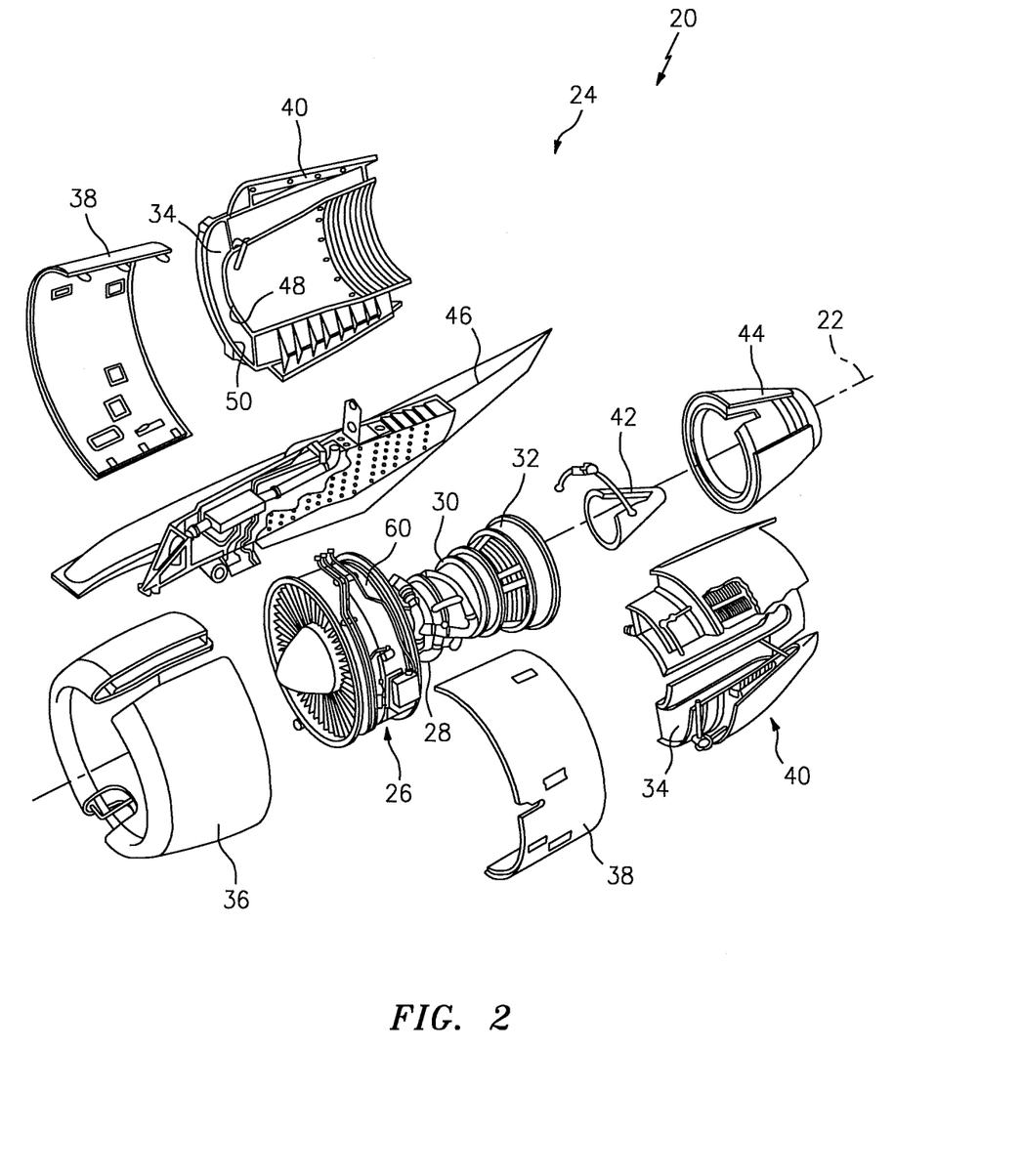
FIG. 2 is an exploded view of the turbofan engine.

Referring to FIGS. 1 and 2, a turbofan engine 20 is centered about an axis 22 and includes a nacelle 24 that supports and generally surrounds an inner engine core that includes a fan section 26, a compressor section 28, a combustor section 30 and a turbine section 32. The fan section 26 drives air along a bypass flowpath or duct 34 and the combustor section 30 receives a portion of air from the fan section 26 and drives air along a core flowpath (not shown) for compression by the compressor section 28, then into the combustor section 30. The core air is mixed with fuel in the combustor section 30 and burned producing energy. The core air or exhaust from the combustor section 30 is expanded through the turbine section 32 and, in-turn, drives a central shaft (not shown) that powers the fan section 26.

The combusted core airflow generally powers the fan section 26 and the bypass airflow provides the majority of forward propulsion for the engine 20. More traditional turbofan engines may have a bypass airflow to core airflow ratio (i.e. bypass ratio) of about six (6:1). More recent high-bypass ratio engines, such as a geared turbofan engine may have greater bypass ratios and that may exceed ten (10:1).

The nacelle 24 may include an intake cowl 36 disposed forward of the fan section 26, a fan cowl 38 that circumferentially surrounds and shields the fan section 26, a thrust reverser 40 that may circumferentially surround the compressor, combustor and turbine sections 28, 30, 32, an exhaust centerbody 42 aft of the turbine section 32, an exhaust nozzle 44 that is spaced radially outward from the exhaust centerbody 42, and a pylon 46 that supports the engine 20 typically to an undercarriage of an aircraft wing (not shown).

Figure 3:
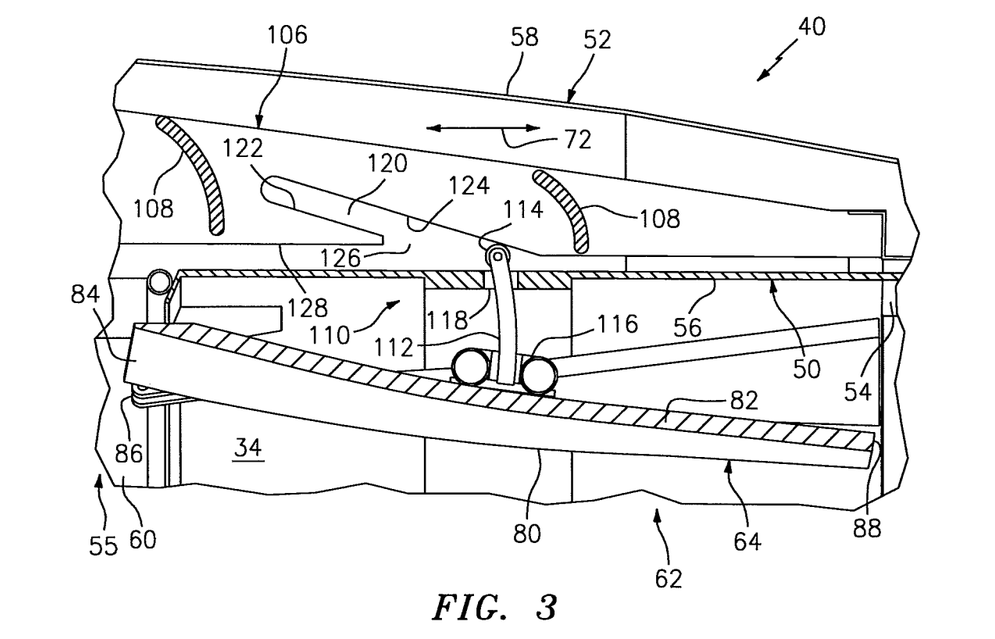
FIG. 3 is a partial cross sectional view of a thrust reverser illustrating a lock mechanism and with portions removed to show detail, and taken along line 3-3 of FIG. 1.
Figure 4:
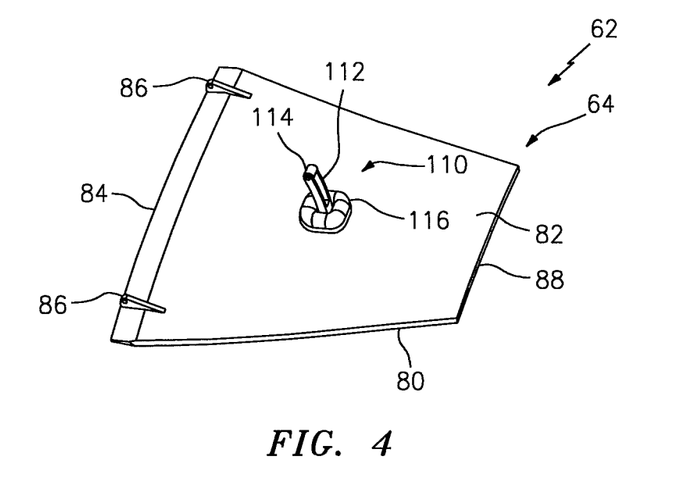
FIG. 4 is a perspective view of a blocker door of the thrust reverser.

Referring to FIGS. 2 through 4, the thrust reverser 40 generally has a radially inner shell 48 and a translating outer shell 50 spaced radially outward from the inner shell 48. The bypass flowpath 34 is defined by and located radially between the inner and outer shells 48, 50; may be generally annular in shape; and, may be located immediately downstream of the fan section 26. The translating outer shell 50 may have a forward section or translating structure 52 and an aft section 54 with both being generally cylindrical and concentric to the engine axis 22. The aft section 54 may translate with the translating structure 52, or in some examples, may be fixed and stationary with respect to the inner shell 48 and/or pylon 46. The translating structure 52 may include a pressure sleeve 56 and an outer casing 58 generally spaced radially outward from the pressure sleeve 56. The pressure sleeve 56 spans axially between a forward portion 60 of a stationary structure 55 such as, for example, a cylindrical fan housing of the fan section 26 and an aft portion of the stationary structure 55 such as, for example, a cascade ring 61 during normal forward propulsion of, for example, an aircraft. Similarly, the outer casing 58 spans axially rearward from the fan cowl 38. The pressure sleeve 56 and the outer casing 58 both span axially rearward and join to one-another at a point that is located generally radially outward from the cascade ring 61. That is, a cross-section of the translating structure 52 resembles a horse-shoe that is open in the forward direction with respect to forward propulsion of the engine 20.

A plurality of blocker door devices 62 of the thrust reverser 40 are distributed circumferentially about the engine axis 22. Each device 62 has a blocker door 64 that is generally located radially inward of the pressure sleeve 56 of the translating structure 52 and spans axially between the fan housing 60 and the aft section 54 of the outer shell 50 during forward propulsion of the engine 20. The blocker door 64 and the translating structure 52 are both capable of coincidental movement relative to the stationary structure 55, thereby redirecting bypass airflow in the bypass flowpath 34 that may generally change aircraft power between forward propulsion and reverse propulsion. Each blocker door device 62 may further include a linkage 66 (see FIG. 7) capable of providing door stability and guiding movement of the blocker door 64 between a stowed state 68 (see FIG. 6) for forward aircraft propulsion and a deployed state 70 (see FIG. 7) for reverse or rearward aircraft propulsion. It is further contemplate and understood that the linkage 66 may be any type of linkage in any variety of configurations that preferably does not obstruct the bypass flowpath 34 when the blocker door 64 is in the stowed state 68 (i.e. does not include a drag link). Such non-obstructing linkages are typically termed 'link-less linkages.'

Figure 6:
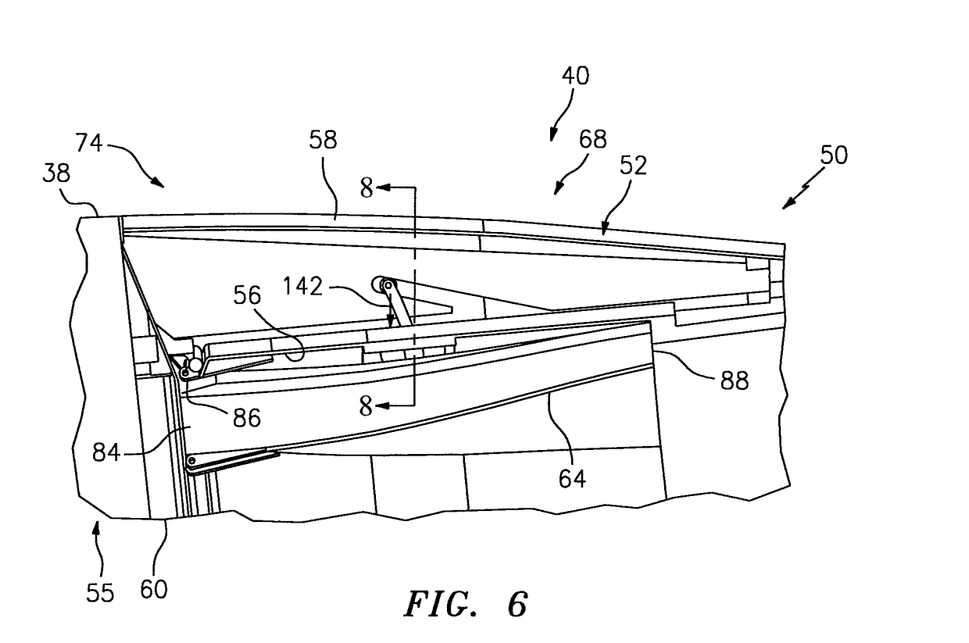
FIG. 6 is a partial cross sectional view of the thrust reverser with portions removed to show detail and with a translating structure of the thrust reverser in the forward position, the blocker door in the stowed state, and a lock mechanism being fully engaged.
Figure 7:
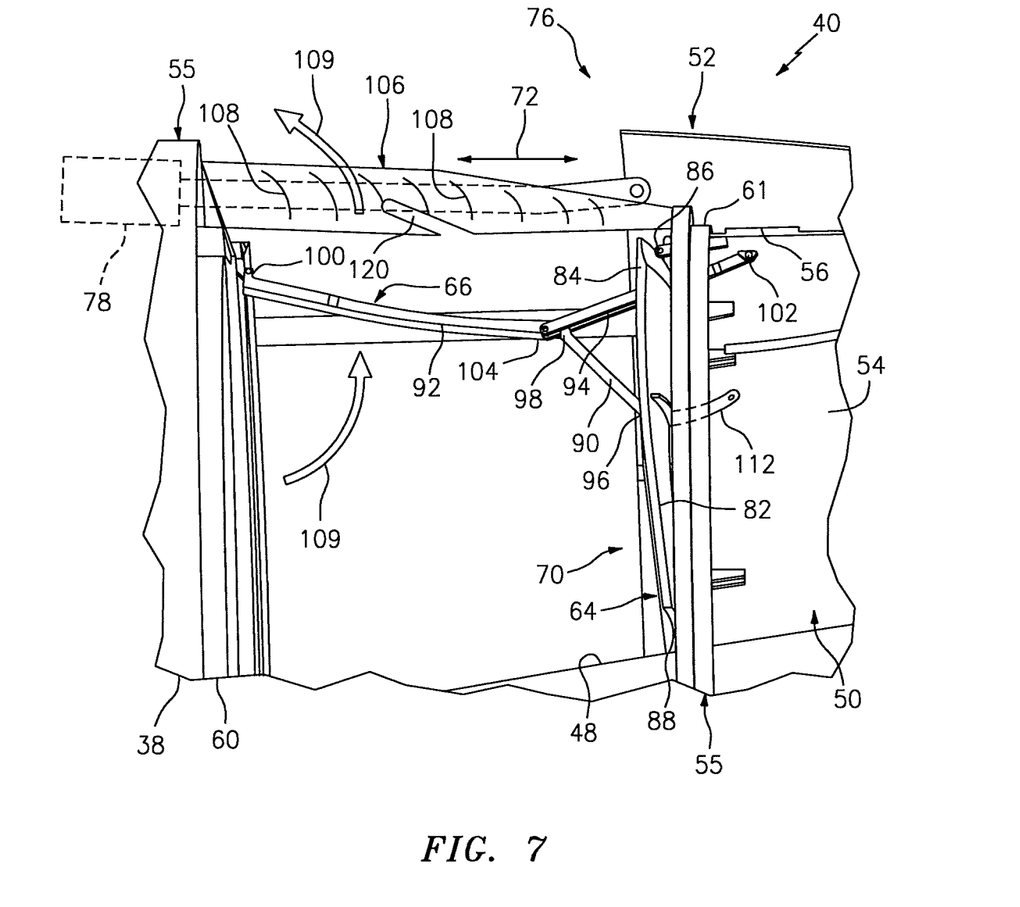
FIG. 7 is a partial cross sectional view of the thrust reverser with portions removed to show detail and with a translating structure of the thrust reverser in an aft position, the blocker door in the deployed state, and a lock mechanism being fully disengaged.

Referring to FIGS. 3, 6 and 7, the translating structure 52 of the outer shell 50 is driven substantially in an axial direction (see arrow 72), between a retracted or forward position 74 (see FIG. 6), placing the blocker door 64 in the stowed state 68, and an aft position 76 (see FIG. 7) placing the blocker door 64 in the deployed state 70. When in the forward position 74, the translating structure 52 may be substantially axially aligned to, and located radially outward from, the stowed blocker door 64. When in the aft position 76, the translating structure 52 may be substantially, axially, rearward to (i.e. aft of) the blocker door 64; axially aligned to the cascade ring 61; and, located substantially radially outward from the blocker door 64.

At least one master actuator 78 of the thrust reverser 40 (see FIG. 7) powers the axial movement of the translating structure 52 and may (as non-limiting examples) be hydraulically or electrically actuated or a combination of both. The actuator 78 may have a drive unit secured rigidly to the fan housing 60 and a hydraulic aim linked to the translating structure 52 and capable of being extended and retracted from the drive unit. The actuator 78 may be described as a 'master' and the linkage 66 may be described as a 'slave linkage' in the sense that the actuation of linkage 66 is directly dependent upon the driven motion of the translating structure 52. That is, without linear motion of structure 52, the linkage 66 may not move.

Referring to FIGS. 3 and 4, the blocker door 64 has an exposed surface 80 that defines in-part the bypass flowpath 34 and an opposite surface 82 that faces radially outward and toward the pressure sleeve 56 when the blocker door 64 is in the stowed state 68 (see FIG. 6). When in the deployed state 70 (see FIG. 7), the surface 82 of the blocker door 64 may face in a substantially, axial downstream direction. The blocker door 64 further has and extends between a base or edge portion 84 attached to a forward end of the pressure sleeve 56 of the translating structure 52 by a pivotal connection 86, and an opposite distal edge 88. When in the stowed state 68, the edge portion 84 may be proximate to a rearward edge of the fan housing 60 and the distal edge 88 may be proximate to a forward edge of the aft section 54 of the outer shell 50. Similarly, and when in the stowed state 68, a forward edge of the pressure sleeve 56 may be releasably sealed to the rearward edge of the fan housing 60, and a forward edge of the outer casing 58 of the translating structure 52 is proximate to a rearward edge or portion of the fan cowl 38. When in the deployed state 70, the blocker door 64 extends substantially radially; the edge portion 84 of the door 64 remains pivotally engage to the pressure sleeve 56, and the distal edge 88 may be proximate to the inner shell 48.

Referring to FIG. 7, the blocker door 64 is capable of 'compound motion' that includes: (1) linear, motion attributable to the door 64 being directly engaged to the translating structure 52, and, (2) rotational or pivotal motion attributable to the rotational capability of the pivotal connection 86 and the multi-armed linkage 66. Furthermore, the blocker door device 62 may include a 'lost motion' device in at least one sense that the translating structure 52 may move a relatively short axial distance rearward when initially moving away from the forward position and before the blocker door 64 begins to pivot away from the stowed state. This lost motion can be enabled by the configuration of the linkage 66 or can be designed into a roller yoke or arm 112.

Referring to FIG. 7, one non-limiting example of the linkage 66 is illustrated and may include first, second, and third aims 90, 92, 94 with associated first, second, third, fourth and fifth pivotal joints 96, 98, 100, 102, 104. Each joint 96, 98, 100, 102, 104 and the pivotal connection 86 may have respective rotational axis (not shown) that are substantially parallel to one-another. The first arm 90 is engaged to the blocker door 64 by joint 96 at a first end and is engaged to an end of the second arm 92 by the second joint 98. The second arm 92 is also engaged to the fan housing 60 (or stationary structure rigidly engaged thereto) at an opposite end by the third joint 100. An end of the third arm 94 is engaged to the translating structure 52 by the fourth joint 102 and an opposite end of the third arm 94 is engaged to the second arm 92 by the fifth joint 104. The fourth joint 102 is spaced axially downstream from the pivotal connection 86, and the fifth joint 104 is located between the second and third joints 98, 100, and may be coincident or further proximate to and slightly spaced from the second joint 98. The third arm 94 may extend through a slot (not shown) in the blocker door 64 and no substantial portion of the linkage 66 extends across or otherwise obstructs bypass airflow during forward engine propulsion, thus airflow efficiency is not reduced during normal flight operating conditions and noise is minimized.

Referring to FIGS. 3 and 7, the thrust reverser 40 may include a stationary member 106 that may have at least one turning vane 108 which functions to further divert bypass air flow (see arrow 109 in FIG. 7) from a downstream direction and to, at least in-part, an upstream direction when the blocker door 64 is in the deployed state 70. The cascade member 106 may be generally cylindrical and concentric to the engine axis 22, and spans axially between the fan housing 60 and the cascade ring 61 of the stationary structure 55. Because the member 106 may be rigidly secured to the fan housing 60 and/or the cascade ring 61, the member remains stationary. Therefore, when the translating structure 52 of the outer shell 50 is in the forward position 74 (see FIG. 6), the stationary member 106 is generally stored between the pressure sleeve 56 and the casing 58 of the translating structure 52 and the turning vanes 108 supported by the member are therefore generally non-functional. When the translating structure 52 is in the aft position 76 (see FIG. 7), the stationary member 106 is generally exposed to or in the diverted bypass flowpath and the diverted bypass air may flow through the member 106 and is further diverted by the turning vanes 108 toward a forward direction.

Referring to FIGS. 3 and 6, the thrust reverser 40 further includes a lock mechanism 110 that may be used in combination with the linkage 66 or any other linkage that does not include a 'drag link' and is thus stowed in a limited area of space when the blocker door 64 is in the stowed state 68. Furthermore, the lock mechanism 110 may be advantageous when combined with a linkage that loses some or all of its moment arm (i.e. mechanical advantage) when the blocker door is in or near the stowed state 68.

The lock mechanism 110 may include an arm 112 that may project rigidly outward from the surface 82 of the blocker door and to a friction-reducing, distal, head 114, a resilient seal 116 that may be engaged to the surface 82 and surrounds a base of the arm 112, an aperture 118 communicating through the pressure sleeve 56, a channel 120 in the stationary member 106 and defined between two opposing tracks 122, 124, and an opening 126 in a face 128 of the stationary member 106 that faces radially inward with respect to the engine axis 22 and communicates directly with the channel 120. The channel 120 extends from the opening 126 and angles in an upstream (i.e. forward) and radially outward direction.

Figure 8:
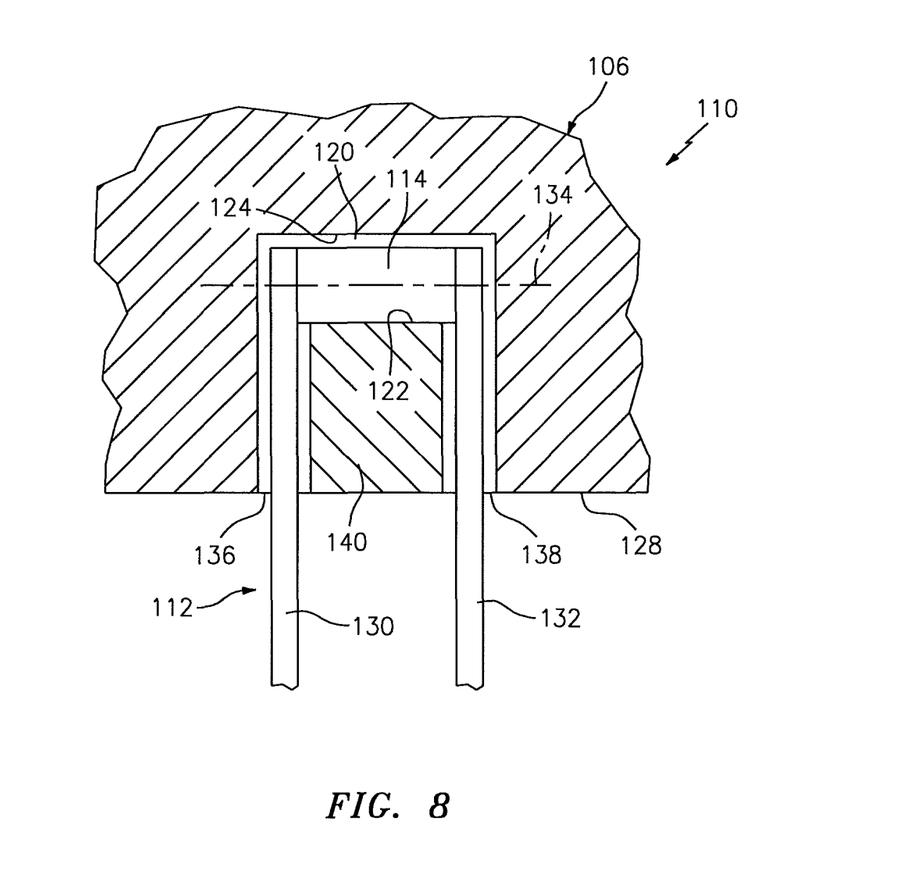
FIG. 8 is a partial cross sectional view of the lock mechanism taken along line 8-8 of FIG. 5.

Referring to FIGS. 6 and 8, the arm 112 may be a roller yoke having first and second stanchions 130, 132, and the distal head 114 may be a roller having a rotational axis 134 for rolling contact upon the tracks 122, 124. The roller 114 is disposed between and rotationally supported by distal ends of each stanchion 130, 132. When the blocker door 64 is near or in the stowed state 68, the stanchions 130, 132 are received by respective parallel slots 136, 138 that co-extend axially with the channel 120 and extend laterally between the channel the face 128 of the stationary member 106. That is, the slots 136, 138 communicate through the face 128 and with the channel 120 and opening 126. The lock mechanism 110 may further include a ramp-like projection 140 that carries the first track 122, which faces substantially radially outward with respect to the engine axis 22; is located between and defines in part the two slots 136, 138; and, is defined between the first track 122 and the face 128 of the stationary member.

During engagement operation of the lock mechanism 110 and when the translating structure 52 is in the aft position 76 and the blocker door is in the deployed state 70, (see FIG. 7) the lock mechanism 110 is completely disengaged and the arm 112 does not project through the aperture 118 of the pressure sleeve 56 (see FIG. 3) nor is the arm in the channel 120. As the actuator 78 pulls or drives the translating structure 52 toward the forward position 74 (see FIG. 6) the linkage 66 begins to guide or urge rotation of the blocker door 64 in a counter-clockwise direction and toward the stowed state 68.

Figure 5:
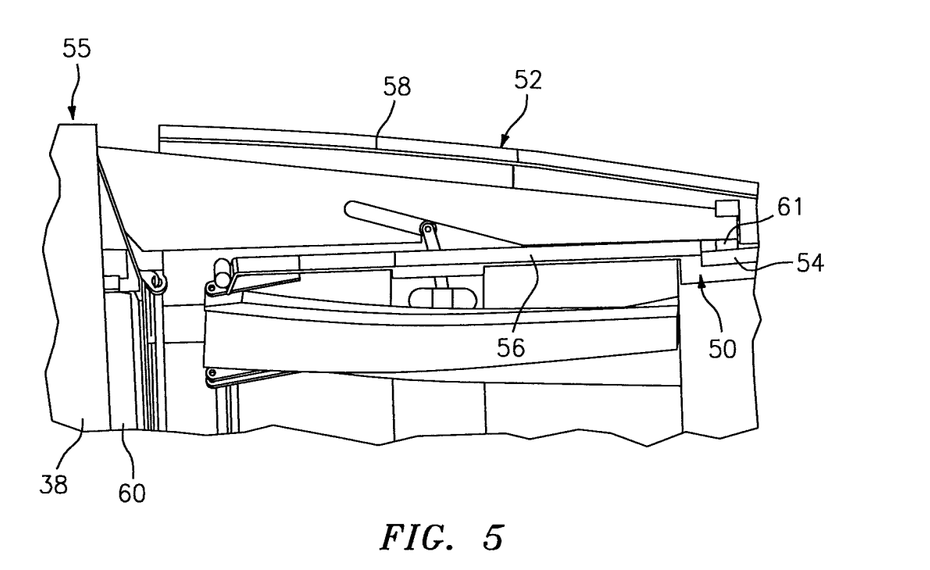
FIG. 5 is a partial cross sectional view of the thrust reverser with portions removed to show detail and with a translating structure of the thrust reverser in a forward position and the blocker door orientated between stowed and deployed states.

Referring to FIG. 3 then FIG. 5, and when the thrust reverser is nearly stowed, forward movement of the pressure sleeve 56 of the translating structure 52 begins to axially align the aperture 118 in the pressure sleeve 56 to the opening 126 in the stationary member 106. At about the same time, the arm 112 begins to project through the aperture 118, then through the opening 126, and the roller 114 may contact the second track 124 carried by the stationary member 106 and that faces partially radially inward. With continued stowing operation, the translating structure 52 moves further forward and the roller 114 enters further into the channel 120 as a distal tip of the projection 140 enters the space between the two stanchions 130, 132 of the arm 112. At about this point in travel, the roller 114 may contact the first track 122 and continue to roll thereon and further into the channel 120 with continued stowing operation. As the roller 114 rolls upon the first track 122, the resilient seal 116 may sealably contact the pressure sleeve 56. Continued travel of the roller 114 through the channel 120 causes the seal 116 to compress creating a reactive force (see arrow 142 in FIG. 6) that biases the roller 114 against the first track 122.

Referring to FIGS. 5 and 6, the blocker door 64 may be in the fully stowed state 68 and the lock mechanism 110 is fully engaged slightly before the translating structure 52 moves into the forward position 74. Likewise, the translating structure 52 will begin to open prior to the blocker door 64 being deployed. During initial deployment (or vice-versa during final stowage), this small distance of translating structure 52 travel, without travel or motion of the blocker door 64 denotes a lost-motion event between the translating structure and the blocker door.

It is understood that relative positional terms such as "forward," "aft," "upper," "lower," "above," "below," and the like are with reference to the normal operational attitude and should not be considered otherwise limiting. It is also understood that like reference numerals identify corresponding or similar elements throughout the several drawings. It should be understood that although a particular component arrangement is disclosed in the illustrated embodiment, other arrangements will also benefit. Although particular step sequences may be shown, described, and claimed, it is understood that steps may be performed in any order, separated or combined unless otherwise indicated and will still benefit from the present disclosure.

The foregoing description is exemplary rather than defined by the limitations described. Various non-limiting embodiments are disclosed; however, one of ordinary skill in the art would recognize that various modifications and variations in light of the above teachings will fall within the scope of the appended claims. It is therefore understood that within the scope of the appended claims, the disclosure may be practiced other than as specifically described. For this reason, the appended claims should be studied to determine true scope and content.

What is claimed is:

1. A thrust reverser comprising:
    a translating structure constructed and arranged to move between first and second positions;
    a blocker door pivotally engaged to the translating structure for pivotal movement between a first state and a second state, the blocker door extending between opposing first and second surfaces, and the first surface configured to partially form a bypass flowpath which bypasses a core flowpath;
    a stationary member; and
    a lock mechanism arranged between the blocker door and the stationary member, the lock mechanism including a first track, an arm and a distal head, wherein the first track is mounted with the stationary member, the arm projects outward from the second surface to the distal head, and the distal head comprises a roller configured with and guided along the first track, wherein the lock mechanism is engaged when the blocker door is in the first state and the translating structure is in the first position, and disengaged when the blocker door is in the second state and the translating structure is in the second position.

2. The thrust reverser set forth in claim 1 wherein the stationary member includes turning vanes for diverting bypass flow.

3. The thrust reverser set forth in claim 1 wherein the lock mechanism is arranged between the second surface and the stationary structure.

4. The thrust reverser set forth in claim 3 wherein the blocker door includes a base edge portion and an opposite distal edge, and the base edge portion is pivotally engaged to the translating structure.

5. The thrust reverser set forth in claim 4 wherein the arm projects through at least a portion of the translating structure when the blocker door is in the first state.

6. The thrust reverser set forth in claim 5 wherein the arm does not extend through the translating structure when the blocker door is in the second state.

7. The thrust reverser set forth in claim 1 wherein the lock mechanism includes a second track opposed to and spaced from the first track and carried by the stationary structure, and wherein the roller is guided between the first and second tracks.

8. A thrust reverser comprising:
    a translating structure constructed and arranged to move between first and second positions;
    a blocker door pivotally engaged to the translating structure for pivotal movement between a first state and a second state;
    a stationary member; and
    a lock mechanism arranged between the blocker door and the stationary member;
    wherein the blocker door includes an exposed surface defining in-part a bypass flowpath and an opposite surface with the lock mechanism arranged between the opposite surface and the stationary structure;
    wherein the blocker door includes a base edge portion and an opposite distal edge, and the base edge portion is pivotally engaged to the translating structure;
    wherein the lock mechanism includes an arm projecting outward from the opposite surface, and through at least a portion of the translating structure when the blocker door is in the first state;
    wherein the arm projects to and su sorts a distal head and the head rides upon a first track of the lock mechanism carried by the stationary member;
    wherein the lock mechanism includes a second track opposed to and spaced from the first track and carried by the stationary structure; and
    wherein the distal head is a roller guided between the first and second tracks.

9. A nacelle for a turbofan engine comprising:
    a stationary member concentric to an engine axis;

a translating structure constructed and arranged to move between a first position and a second position; and a blocker door device constructed and arranged to move between a stowed state when the translating structure is about in the first position and a deployed state when the translating structure is in the second position, the blocker door device including a blocker door and a lock mechanism, the blocker door being movably engaged to the translating structure and including a first surface defining in-part a bypass flowpath and an opposite second surface, and the lock mechanism orientated between the second surface and the stationary member;

wherein the lock mechanism comprises a track and a roller configured to be supported by and move along the track; and wherein the bypass flowpath bypasses a core flowpath and wherein the lock mechanism is engaged when the blocker door is in the stowed state and the translating structure is in the first position, and disengaged when the blocker door is in the deployed state and the translating structure is in the second position.

10. The nacelle set forth in claim 9 wherein the lock mechanism is locked when the blocker door is in the stowed state.

11. The nacelle set forth in claim 10 wherein the stationary member includes a diverting vane and the stationary member is exposed to the bypass flowpath when the blocker door is in the deployed state and is isolated from the bypass flowpath when the blocker door is in the stowed state.

12. The nacelle set forth in claim 11 wherein the lock mechanism is orientated between the second surface and the stationary member and extends through at least a portion of the translating structure when the blocker door is in the stowed state and does not extend through the translating structure when the blocker door is in the deployed state.

13. The nacelle set forth in claim 12 wherein the lock mechanism further includes an aim projecting outward from the second surface and to a distal head comprising the roller, and the track is supported by the stationary member.

14. The nacelle set forth in claim 13, wherein the lock mechanism further includes a second track supported by the stationary member, and the roller is configured to be guided between the track and the second track.

\* \* \* \* \*

UNITED STATES PATENT AND TRADEMARK OFFICE
CERTIFICATE OF CORRECTION

PATENT NO.         : 9,611,808 B2                                    Page 1 of 1
APPLICATION NO.    : 14/222165
DATED              : April 4, 2017
INVENTOR(S)        : Gormley It is certified that error appears in the above-identified patent and that said Letters Patent is hereby corrected as shown below:

In the Specification
Column 4, Line 62, please delete "aim" and insert --arm--.
Column 5, Line 42, please delete "aims" and insert --arms--.

In the Claims
Column 8, Line 58, Claim 8 please delete "su sorts" and insert --supports--.
Column 10, Line 15, Claim 13 please delete "aim" and insert --arm--.

Signed and Sealed this
Sixteenth Day of May, 2017

Michelle K. Lee
*Director of the United States Patent and Trademark Office*